Sept. 20, 1971     O. INGRAM     3,605,639
FIBER GLASS HATCH COVER
Filed July 23, 1968     4 Sheets-Sheet 1

Inventor:
Orville Ingram
By Wilmer Mechlin
his Attorney

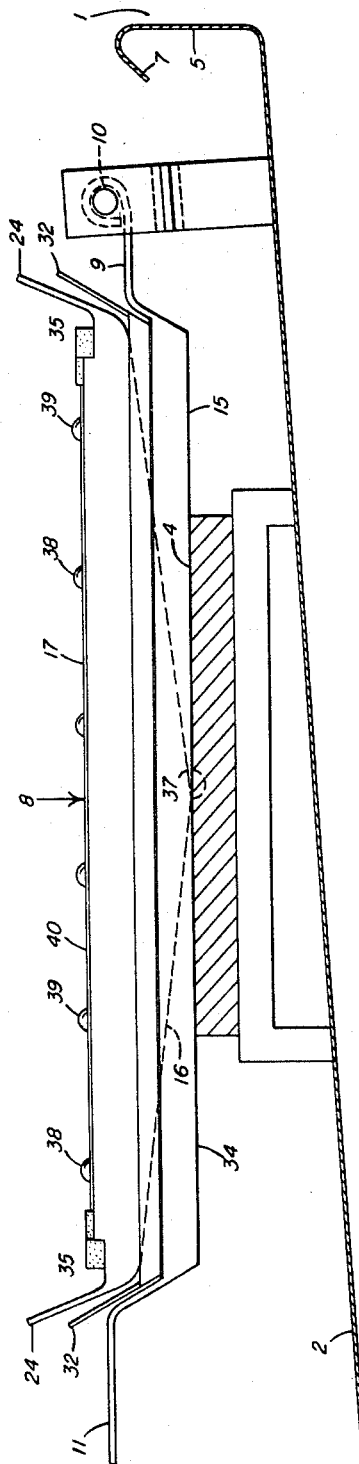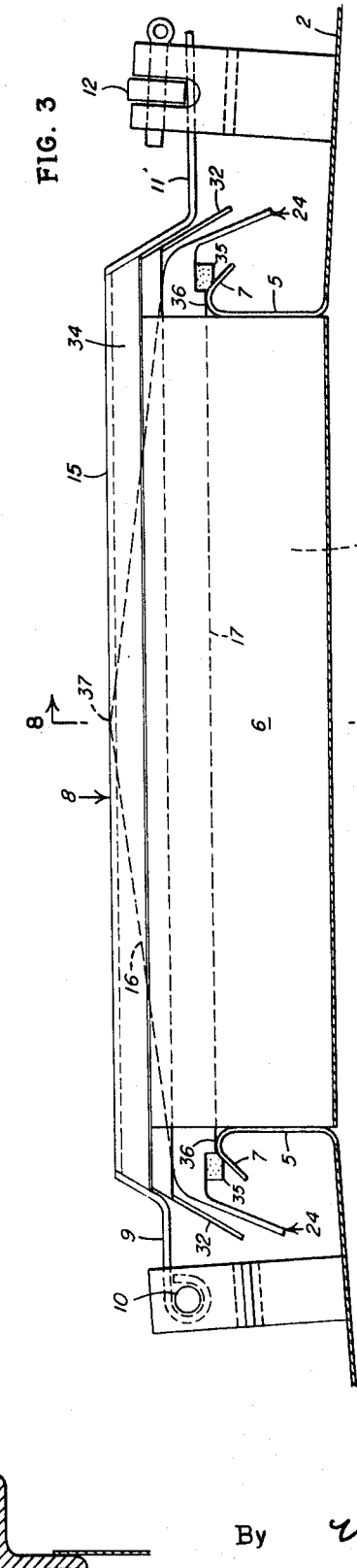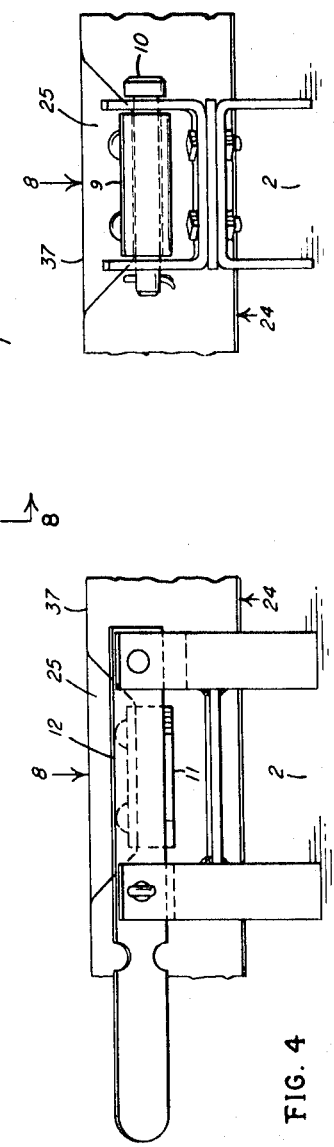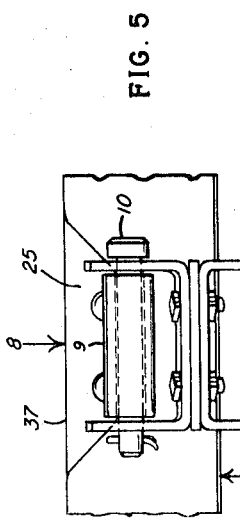

Sept. 20, 1971 O. INGRAM 3,605,639
FIBER GLASS HATCH COVER
Filed July 23, 1968 4 Sheets-Sheet 3

Inventor:
Orville Ingram

By Wilmer Mechlin
his Attorney

Sept. 20, 1971  O. INGRAM  3,605,639
FIBER GLASS HATCH COVER

Filed July 23, 1968  4 Sheets-Sheet 4

Inventor:
Orville Ingram
By Wilmer Mechlin
his Attorney

United States Patent Office 3,605,639
Patented Sept. 20, 1971

3,605,639
FIBER GLASS HATCH COVER
Orville Ingram, Toledo, Ohio, assignor to Midland-Ross
Corporation, Cleveland, Ohio
Filed July 23, 1968, Ser. No. 746,787
Int. Cl. B61d 39/00
U.S. Cl. 105—377                    9 Claims

ABSTRACT OF THE DISCLOSURE

A molded fiber glass cover for roof hatches of covered railway hopper cars, the hatch cover being of a hollow, internally integral truss-reinforced construction combining great strength and durability with very light weight.

BACKGROUND OF THE INVENTION

Covered railway hopper cars are loaded through roof hatches which ordinarily are centered laterally on their roofs and straddled by walkways and normally are closed by hinged hatch covers. While sometimes circular, the hatches more often are rectangular and a given car may have one continuous hatch extending substantially the length of its roof or a plurality of separate hatches arranged in tandem. Due to the heavy weight otherwise required to be lifted in swinging them between open and closed positions, the hatch covers most recently proposed have been of molded fiber glass construction, which even in the usual length range of 11 to 13 ft., can be readily handled by one man. However, prior such hatch covers have lacked the rigidity of metal covers and generally been prone to cracking when thrown open to one side against a walkway. It is with the elimination of these problems in fiber glass hatch covers that the present invention is particularly concerned.

SUMMARY OF THE INVENTION

The primary object of the present invention is to provide an improved fiber glass hatch cover, which, by being hollow and internally reinforced by one or more integrally formed fiber glass trusses, minimizes weight while possessing rigidity and great load-support strength.

Another object of the invention is to provide a fiber glass hatch cover of the character described in the previous object and having a center reinforcing truss forming on its upper surface a central ridge along which the cover contacts an adjoining walkway when thrown open, thereby effectively inhibiting cracking.

A further object of the invention is to provide an internally truss-reinforced fiber glass hatch cover wherein the cover is molded of a glass fiber-reinforced, exothermally curing resin and formed of separately molded upper and lower panels bonded together by curing of fiber glass in or coating abutting surfaces of the panels, on the lower of which panels before curing each truss is formed by applying the fiber glass over a corrugated board or like suitable form supported on the lower panel and each truss extends to the upper panel and is bonded thereto by curing of fiber glass on contacting surfaces.

In the preferred embodiment in which a continuous roof hatch is closed in sections by a plurality of the improved hatch covers, with the joints at the ends of the hatch and between the ends of the covers normally covered by separately hinged rain shields clamped against upstanding rain deflectors, each cover is internally reinforced by a plurality of integrally formed, longitudinally extending fiber glass trusses, one at the center and a pair toward opposite sides. Joined intermediate their sides by the trusses, the upper and lower panels of each cover are joined at their sides by abutting, down-sloping side flanges. Compressible gaskets on the underside of the lower panel are adapted to seal against upstanding flanges bounding the sides of the hatch, with the gaskets protected in the extent of their compressibility by downstanding shoulders adjacent each end of the lower panel and directly engageable with the bounding flanges. Wood or like suitable fillers inserted between the panels at the locations of the hardware, facilitate attachment of the latter to the cover.

The foregoing and other objects and features of the invention will appear hereinafter in the detailed description, be particularly pointed out in the appended claims and be illustrated in the accompanying drawings, in which:

FIGURE DESCRIPTION

FIG. 2 is a fragmentary vertical sectional view on an enlarged scale taken along lines 2—2 of FIG. 1;

FIG. 3 is a fragmentary vertical sectional view on the scale of FIG. 2, taken along lines 3—3 of FIG. 1;

FIG. 4 is a fragmentary vertical sectional view on the scale of FIG. 2, taken along lines 4—4 of FIG. 1;

FIG. 5 is a fragmentary vertical sectional view on the scale of FIG. 2, taken along lines 5—5 of FIG. 1;

DETAILED DESCRIPTION

Figure 1:
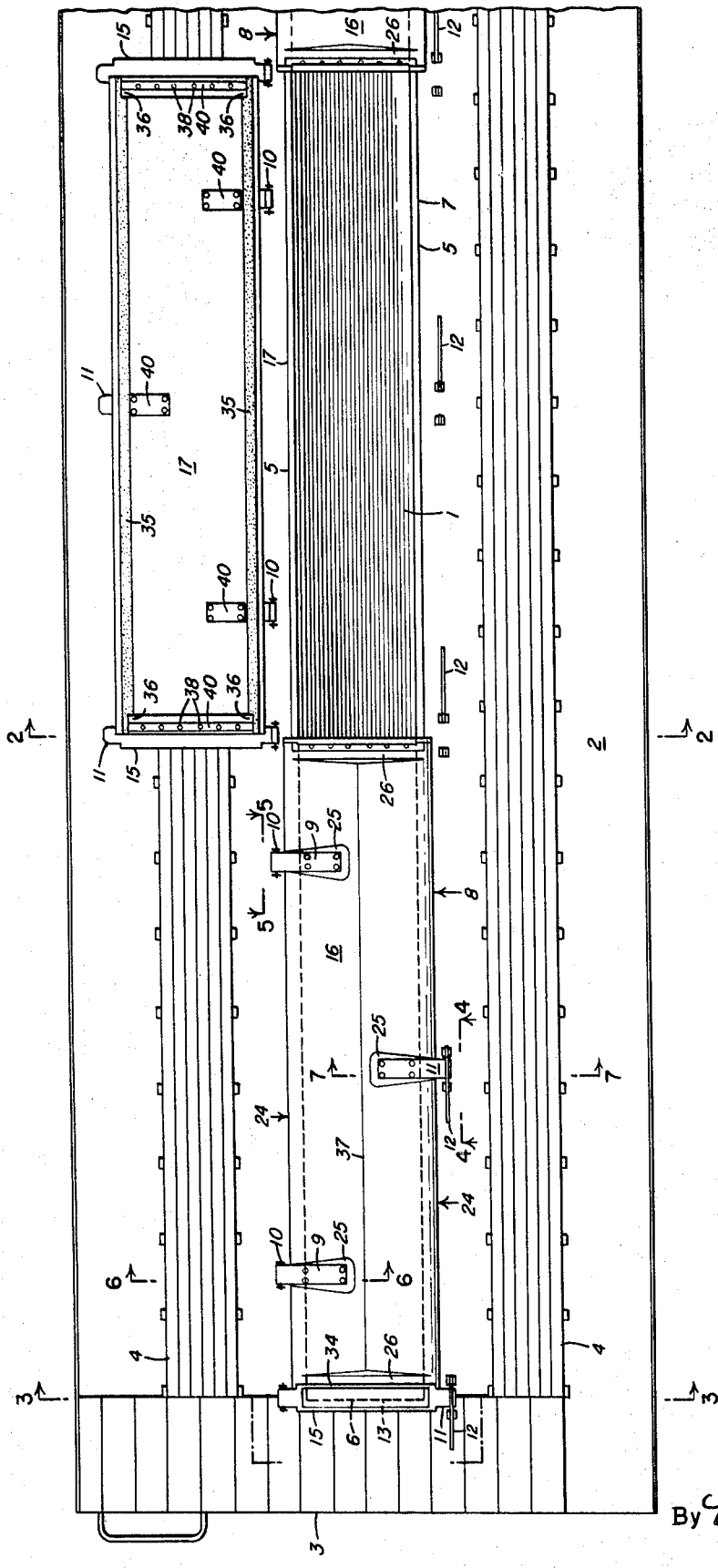
FIG. 1 is a partial plan view of a covered railway hopper car having a continuous roof hatch closed in sections by a plurality of the improved fiber glass hatch covers of the present invention.
Figure 6:
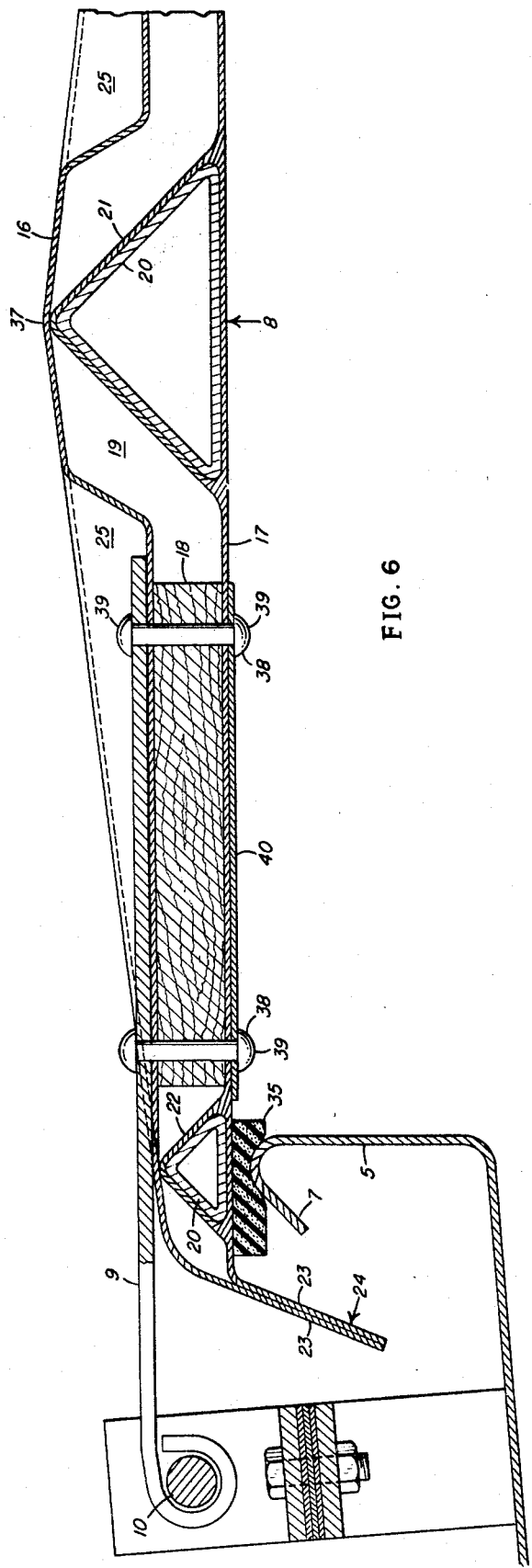
FIG. 6 is a fragmentary vertical sectional view on a further enlarged scale, taken along lines 6—6 of FIG. 1.
Figure 7:
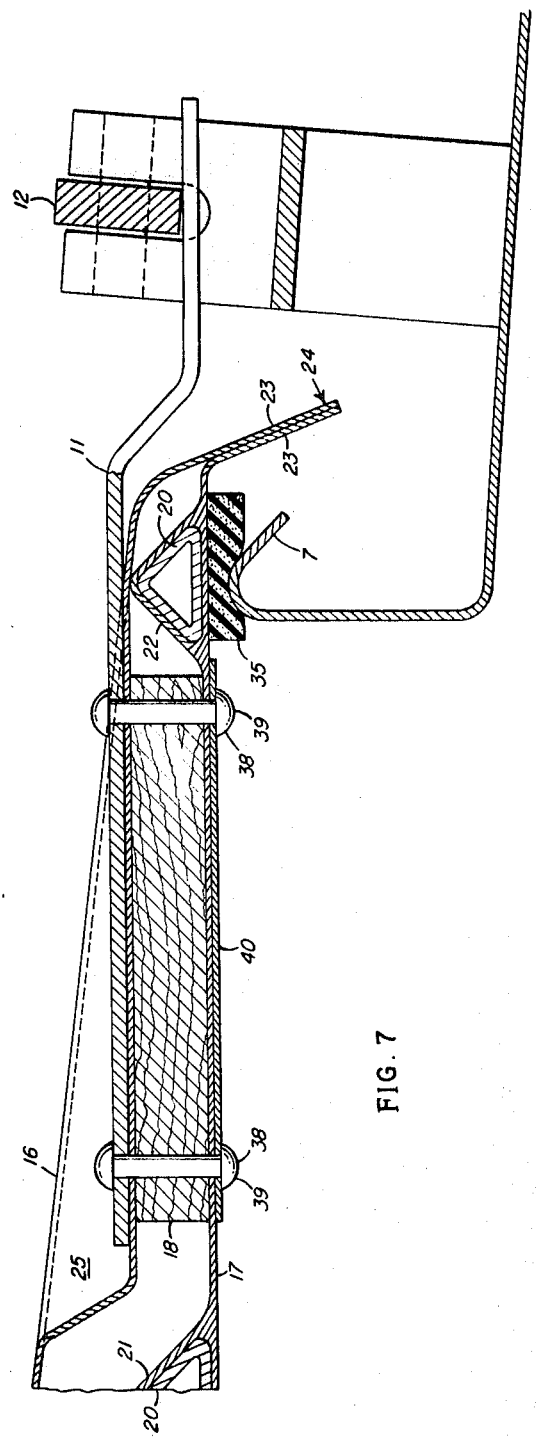
FIG. 7 is a fragmentary vertical sectional view on the scale of FIG. 6, taken along the lines 6—6 of FIG. 1.
Figure 9:
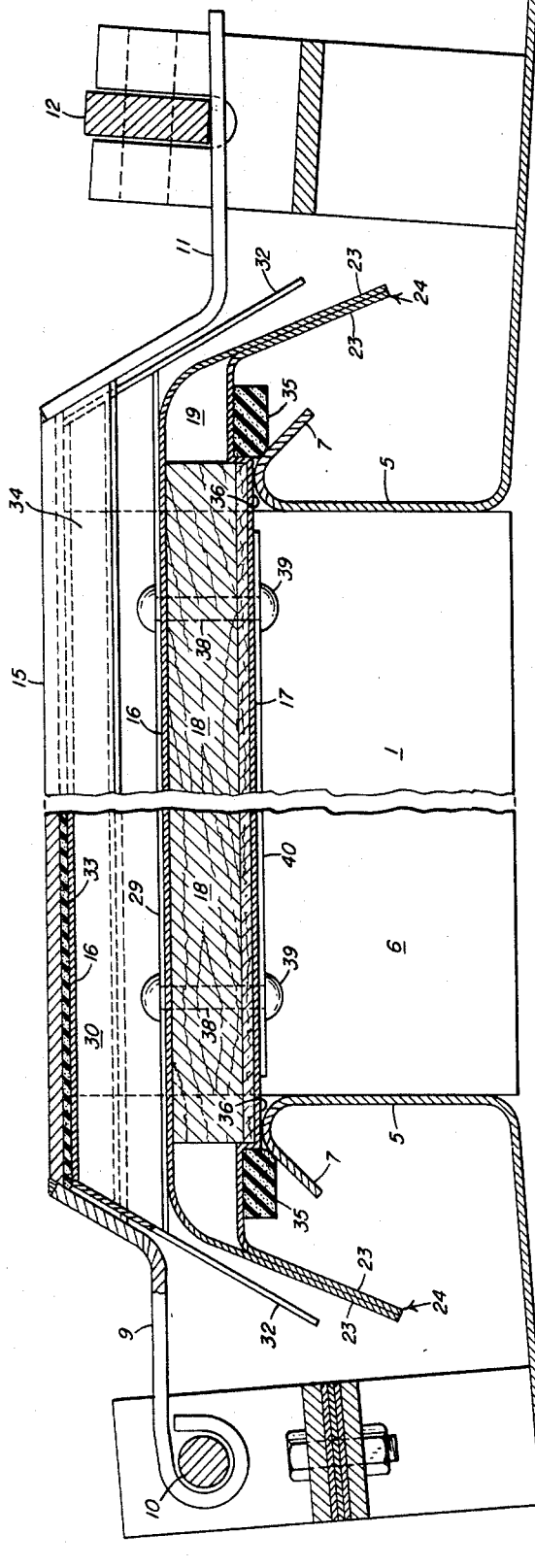
FIG. 9 is a vertical sectional view taken along lines 9—9 of FIG. 8, with part of the sealing member shown in elevation.
Figure 8:
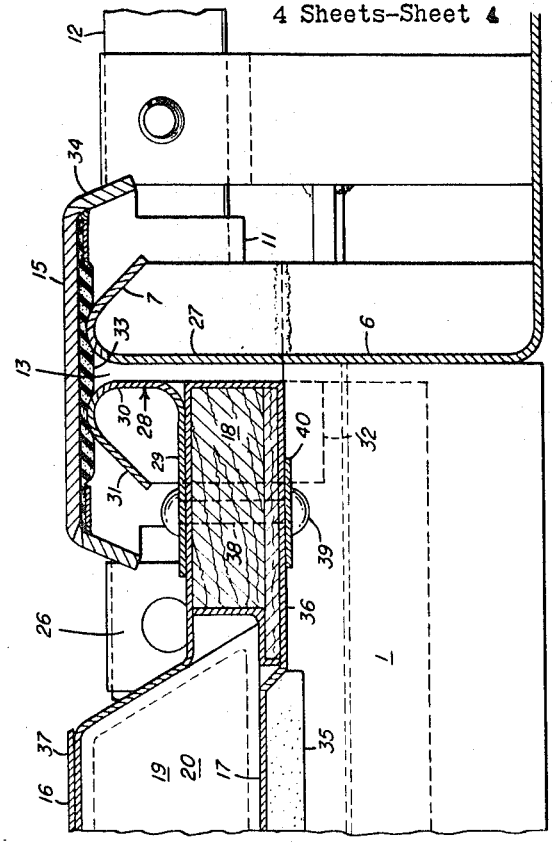
FIG. 8 is a fragmentary vertical sectional view on the scale of FIG. 6, taken along lines 8—8 of FIG. 3.
Figure 10:
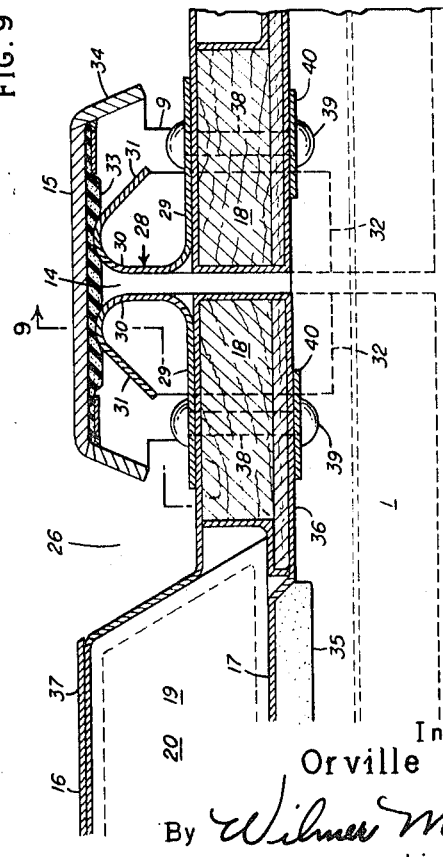
FIG. 10 is a fragmentary vertical sectional view similar to FIG. 8 but taken at a joint between a pair of the hatch covers.

Referring now in detail to the drawings in which like reference characters designate like parts, the improved fiber glass hatch cover of the present invention is equally adapted for covering a section of a continuous hatch or entirely covering one of a plurality of separate hatches, depending on the roof hatch arrangement employed on the particular covered hopper car. However, as the continuous hatch arrangement now appears to be preferred on new construction cars, an application to such an arrangement has been illustrated as exemplary of the invention.

In accordance with now conventional practice in the construction of covered railway hopper cars having continuous roof hatches, the illustrated continuous roof hatch or loading opening 1 is a generally rectangular central opening extending substantially the length of and centered laterally on the roof 2 of the covered hopper car 3 and for access is straddled by a pair of longitudinally coextensive walkways 4. The hatch 1 is bounded at the sides and ends by upstanding side and and end flanges 5 and 6, respectively, each rigid or integral with the roof 2 and generally of inverted J-shape with its lip 7 out-turned to clear and deflect rain or other foreign matter away from the hatch. Also conventionally, there is a plurality of hatch covers 8, each covering a section, usually from 11 to 14 ft. long, of the hatch 1 and the covers are all hinged at the same side, each suitably by a pair of hinge straps 9 fixed thereto and hinging or swinging on concentric, longitudinally extending hinge pins 10 mounted on the roof 2 at the corresponding side of the hatch 1, for enabling the hatch covers to be swung vertically from closed positions covering their sections of the hatch to open positions against or resting on the adjoining walkway 4.

A locking or latch tongue or tongue strap 11, fixed to and projecting centrally from the opposite or distal side of each hatch cover 8 and engageable by a lock bar 12 pivotally mounted on the roof 2 at the corresponding side of the hatch, enables the cover to be releasably locked, clamped or held in closed position. As usual in such installations, the end joints 13 between the end hatch covers and the roof and intermediate joints 14 between adjoining covers, are covered when the hatches are closed by sealing members or rain shields 15 individually hinged to the roof on the same side of the hatch as the covers for swinging to open position against the same walkway 4.

Any of the improved hatch covers 8 of this invention in essence is a hollow, internally truss-reinforced member of molded fiber glass, the term "fiber glass," as here used, having its now common meaning of a glass fiber-reinforced plastic. To simplify manufacture, the preferred plastic is one that cures exothermally with the ambient air at room temperature and during curing will adhere to itself to form a bond so strong as to render an extraneous bonding agent unnecessary, a styrenated polyester resin having these properties being particularly suitable for the purpose. The preferred hatch cover is formed of separately molded upper or top and lower or bottom panels 16 and 17, respectively, which are fitted together for bonding to each other by curing of fiber glass on their contacting or abutting surfaces.

In process of assembling or fitting the molded panels 16 and 17 into the ultimate unitary hatch cover, filler blocks 18 of marine plywood or other suitable material, are inserted at appropriate locations between the panels as backings or anchors for subsequent attachment of the hinge and latch straps 9 and 11. Too, there are provided in the hollow space 19 between the panels 16 and 17 one or more, preferably fiber glass trusses, which, on completion of the assembly, connect the panels and are primarily responsible for the hatch cover's rigidity and load supporting strength. If, as illustrated, the lower panel 17 is substantially flat intermediate its extremities, while the upper panel 16 is arched from side to side, the truss or trusses conveniently are formed on the lower rather than the upper panel and by placing on the upper surface of the lower panel, preferably after molding but before curing, a suitable form 20 for each truss over which a coating of the same fiber glass of which the panels are molded is then sprayed or otherwise applied to the desired thickness. At least one center truss 21 extending longitudinally of and centered laterally initially on the lower panel and later the completed hatch cover, is necessary to produce the desired rigidity and the illustrated cover has in addition in the hollow interior 19 a pair of longitudinally extending side trusses 22, one adjacent each side.

While the form of each of the trusses 21 and 22 may vary, in each case a trigonal or triangular truss based on the lower panel 17 and apexed on the upper panel 16 and in section an isosceles or equilateral triangle, has been found particularly suitable. By contacting the top panel 16 while fiber glass on their contacting surfaces is curing, the trusses will bond thereto and effectively join or link the panels into a rigid structure. In addition to being so joined, the panels for the illustrated cover are joined at each side by abutting, down and out-sloping flanges 23, together providing the cover with side flanges 24 extending substantially its length and projecting downwardly below and spaced outwardly from the roof side flanges 5 at the sides of the hatch 1.

The upper and lower panels 16 and 17 may be fitted together before they are cured to bond them to each other by the curing. In such case, it is convenient to leave the lower panel in its mold until it is cured to hold it to mold tolerances and for the same purpose the mold for the upper panel may be inverted thereover. However, while the preferred styrenated polyester resin cures with the ambient air at room temperature, it is exothermal in the curing to the point at which it becomes too hot for ready handling. It usually will be preferred to avoid this handling problem by leaving the panels in their molds until they have cured and then applying a mud or thin layer or coating of the same fiber glass to the apexes of the trusses and the inner or confronting faces of the side flanges 23 on one of the panels, conveniently those on the lower panel. Fitting of the panels together at this juncture will produce a completely effective bond between them by the subsequent curing of the interposed fiber glass layers, although, to ensure bonding of the panel flanges 23 over their entire confronting surfaces, despite any possible unevenness of the interposed layer, it will usually be desirable to clamp the parts together during such curing.

Suitably depressed intermediate its ends to form laterally extending, flat-bottomed pockets 25 in its upper surface for receiving the straps 9 and 11, the upper panel 16, for the illustrated application to a continuous hatch, also is depressed over each end portion to form flat-bottomed end recesses 26, each preferably backed at the bottom by one of the filler blocks 18 and terminating longitudinally of the panel in a down-turned end flange 27 extending downwardly and bonded to the adjoining end of the lower panel 17 and closing that end of the hatch cover.

Received or seated in each of the end recesses 26 is a rain deflector 28 having intermediate its ends a base flange 29, fixed, as by riveting, to the underlying end portion of the cover and an upstanding flange 30 of the generally inverted J-shape of the side and end roof flanges 5 and 6 bounding the hatch 1 but with their lips 31 inturned toward the center of the cover. Completing each rain deflector are unitary or integral out-sloping skirts 32 at its ends which are spaced outwardly from and extend downwardly over the corresponding side flanges 24 of the hatch cover 8. As opposed to the side flanges 5, the end flanges 6 on the roof 2 project upwardly to a higher level and are substantially coterminus upwardly or coplanar in their upper extremities with the upstanding intermediate flanges 30 of the rain deflectors 28 on the ends of the hatch cover. Bounding, with the adjoining rain deflector or roof end flange 6, opposite sides of one of the intermediate and end joints 14 and 13, each deflector and the adjoining or associated deflector or end flange 6 are adapted to be engaged by a rubber or like resilient sealing pad 33 clipped or otherwise attached to and carried by a laterally skirted hood 34 forming the intermediate portion of the related rain shield 15 for sealing the joint when the shield is swung to and, in the manner of the cover 8, locked in closed position.

With the laterally extending end and intermediate joints 13 and 14 so sealable, a like function is performed for the joints at the sides between each hatch cover 8 and the underlying or related sections of the roof side flanges 5 by rubber or like resilient sealing pads 35 adjacent opposite sides and bonded or otherwise suitably secured to the underside of the cover's lower panel 17. Of a width and so located as to engage and be partly compressed by the upper end of the underlying roof side flange 5 in the cover's closed position, each cover pad 35 is inwardly notched adjacent its ends to receive lateral extremities of a downwardly offset, downstanding shoulder or abutment 36 intermediate the sides and on each end portion of the lower panel 17 and preferably backed upwardly by the filler block 18 at that end of the cover 8. Upon closing of the cover, these abutments 36, by engaging the upper ends of the underlying roof side flanges 5, act as stops for limiting the compression and thereby increasing the effective life of the cover pads 35 and without interfering with the sealing engagement between the pads and the side flanges, since, over the extent of the abutments, the embracing portions of the pads compressibly engage and seal against the out-turned lips 7 of those flanges.

As mentioned earlier, the internal or inbuilt center truss 21 of each hatch cover 8 gives it the longitudinal rigidity from which its great strength is principally derived. However, in the preferred embodiment the center truss also performs another important function. As illustrated, the preferred upper panel 16 between the end recesses 25 and except for the pockets 24, is double-sloping with a longitudinally extending ridge 37 at the center from which it slopes downwardly toward either side. The cover thus progressively thickens inwardly from either side toward the laterally centered, longitudinally extending center ridge 37, with its thickness at maximum at that ridge and that thickness or upward projection is predetermined to cause the cover when thrown open to strike against or contact the adjoining walkway 4 along the line of the ridge. Bonded at its apex to and substantially coextensive with and backing the center ridge 37, the preferred triangular center truss 21 effectively reinforces the cover along its line of contact with the walkway. This reinforcement, coupled with the shortness of the moment arm from the hinging axis to the line of contact, relative to a conventional fiber glass hatch cover of substantially uniform thickness and striking the walkway along its distal corner, practically inhibits any cracking of the cover regardless of the force with which it is thrown open.

Of less height or altitude than the center truss 21, as befits their location adjacent the sides of the upwardly tapering hatch cover, the side trusses 22, by preferably overlying and being centered laterally on the upper ends of the roof side flanges 5 engaged by the cover pads 35, reinforce the hatch cover over those areas and correspondingly inhibit cracking when the cover is swung to closed position. Moreover, possible cracking at the connections between the cover and its hardware is inhibited not only by the backing afforded by the filler block 18 but also by extending the rivets or other securing means 38 through the filler blocks and both of the panels 16 and 17 preventing puncture of the panels by the heads 39 of the rivets at the top by parts of the hardware and at the bottom by face plates 40 together sandwiching the panels and sandwiched by the rivet heads.

Constructed in the above manner, a roof hatch about 11 ft. long will weigh only around 50 lbs. including its hardware, and will support a load of as much as 3,000 lbs. Readily handled by an operator due to its lightness and increasing little in weight with increase in its length to the present maximum of around 13 ft., the improved hatch cover, as a result of its practical freedom from cracking and the protection of the sealing pads 35 against overcompression, will have a long service life and require practically no maintenance thereover.

Having now described my invention, I claim:

1. A hatch cover for a roof hatch of a covered railway hopper car comprising a fiber glass cover member having a hollow interior and mounted on a roof of the car for movement between positions to open and close the hatch, said cover member including upper and lower fiber glass panels joined at and spaced intermediate extremities thereof and together enclosing said interior, and hollow fiber glass truss means inside said interior and extending longitudinally of and rigid with said cover member and bonded to said upper and lower panels for longitudinally reinforcing said member, said truss means including a center truss centered laterally on said cover member.

2. A hatch cover according to claim 1, wherein the hatch and in closed position the cover member are generally rectangular in plan and extend longitudinally of and are centered laterally on the roof, the hatch is straddled at opposite sides by walkways extending longitudinally of the roof, the cover member is hinged to the roof at a side of the hatch for swinging vertically between a closed position covering the hatch and an open position against the adjoining walkway, and the upper and lower fiber glass panels are separately molded and bonded together at extremities of the cover member.

3. A hatch cover according to claim 2, wherein the center truss is triangular with a base resting on and bonded to the lower panel and an apex contacting and bonded to the upper panel.

4. A hatch cover according to claim 3, including a triangular form resting on the lower panel and embedded in the center truss by fiber glass covering upper sides thereof and forming corresponding sides of said truss.

5. A hatch cover according to claim 2, including form means resting on the lower panel and embedded in the truss means by fiber glass covering upper sides thereof and forming corresponding sides of the truss means, and wherein the fiber glass forming the panels and the truss means is a glass fiber-reinforced exothermally curing resin bondable to itself during curing.

6. A hatch cover according to claim 5, wherein the truss means includes the center truss centered laterally on and side trusses adjacent opposite sides of the cover member.

7. A hatch cover according to claim 2, wherein the upper panel is double-sloping and slopes toward each side from a central longitudinally extending ridge backed by the center truss, and the cover member on swinging thereof to open position strikes the adjoining walkway along said ridge.

8. A hatch cover according to claim 7, wherein the hatch is bounded at side and ends by upstanding flanges generally of inverted J-shape, and including compressible sealing pad means on and extending longitudinally of an underside of the lower panel adjacent opposite sides thereof and in the closed position of the cover member engaging and compressed by upper ends of said roof side flanges for sealing therebetween and said cover member, and downstanding abutment means on opposite end portions of the lower panel and overlapped outwardly by end portions of said pad means, said abutment means in the closed position of said cover member engaging said upper ends of said side flanges for limiting the compression of said pads, and said pad end portions then sealingly engaging lips on said side flanges outstanding beyond said upper ends thereof.

9. A hatch cover according to claim 8, wherein the hatch is continuous and extends substantially the length of the roof, the cover is one of a plurality of identical covers arranged in tandem along the roof and each closing a section of the continuous hatch, and including a plurality of rain shields each hinged to the roof at the same side as said covers and swingable to a position to close one of the intermediate and end joints respectively between adjoining pairs of covers and between end covers and the ends of the hatch.

References Cited

UNITED STATES PATENTS

| 2,202,015 | 5/1940 | Marinello | 105—377 |
| 2,256,334 | 9/1941 | Zeidler | 105—377 |
| 2,607,302 | 8/1952 | Nystrom | 105—377 |
| 2,970,347 | 2/1961 | Massopust | 105—377 |
| 3,260,224 | 7/1966 | Pettit et al. | 105—377 |
| 2,652,787 | 9/1953 | Keleher | 105—377 |
| 3,250,233 | 5/1966 | Carney, Jr. et al. | 105—377 |
| 3,429,083 | 2/1969 | Voros | 52—309 |

OTHER REFERENCES

Standard Railway Equipment Manufacturing Co., Chicago, Ill.

ARTHUR L. LA POINT, Primary Examiner

R. A. BERTSCH, Assistant Examiner